(12) United States Patent
Zhou et al.

(10) Patent No.: US 11,379,155 B2
(45) Date of Patent: Jul. 5, 2022

(54) SYSTEM AND METHOD FOR FLASH STORAGE MANAGEMENT USING MULTIPLE OPEN PAGE STRIPES

(71) Applicant: Alibaba Group Holding Limited, Grand Cayman (KY)

(72) Inventors: Ping Zhou, Folsom, CA (US); Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 0 days.

(21) Appl. No.: 16/964,140

(22) PCT Filed: May 24, 2018

(86) PCT No.: PCT/CN2018/088188
§ 371 (c)(1),
(2) Date: Jul. 22, 2020

(87) PCT Pub. No.: WO2019/222958
PCT Pub. Date: Nov. 28, 2019

(65) Prior Publication Data
US 2021/0034301 A1    Feb. 4, 2021

(51) Int. Cl.
*G06F 3/06*    (2006.01)
(52) U.S. Cl.
CPC .......... *G06F 3/0659* (2013.01); *G06F 3/0604* (2013.01); *G06F 3/0679* (2013.01);
(Continued)
(58) Field of Classification Search
CPC .... G06F 3/0659; G06F 3/0604; G06F 3/0679; G06F 2212/1028; G06F 2212/1016;
(Continued)

(56) References Cited
U.S. PATENT DOCUMENTS

| 3,893,071 A | 7/1975 | Bossen |
| 4,562,494 A | 12/1985 | Bond |

(Continued)

FOREIGN PATENT DOCUMENTS

| JP | 2003022209 | 1/2003 |
| JP | 2011175422 | 9/2011 |

(Continued)

OTHER PUBLICATIONS https://web.archive.Org/web/20071130235034/http://en.wikipedia.org:80/wiki/logical_block_addressing Wikipedia screen shot retriefed on wayback Nov. 20, 2007 showing both physical and logical addressing used historically to access data on storage devices (Year: 2007).

(Continued)

*Primary Examiner* — Kalpit Parikh
(74) *Attorney, Agent, or Firm* — Shun Yao; Yao Legal Services, Inc.

(57) ABSTRACT

One embodiment facilitates flash storage management. During operation, the system receives a request to write data to a non-volatile memory. The system writes, in a buffer in association with a controller, the data to a next available portion of a current physical page in a page stripe, wherein the page stripe includes physical pages which each correspond to a sequentially ordered die of the non-volatile memory. The system provides power-loss protection to the current physical page and a second physical page which indicates parity information for the page stripe, thereby providing power-loss protection to an increased number of partially full page stripes.

20 Claims, 6 Drawing Sheets

(52) U.S. Cl.
CPC ............... *G06F 2211/1071* (2013.01); *G06F 2212/7204* (2013.01)

(58) Field of Classification Search
CPC ..... G06F 2212/7203; G06F 2212/7204; G06F 12/0246; G06F 2211/1071; Y02D 10/00
See application file for complete search history.

(56) References Cited

U.S. PATENT DOCUMENTS

| | | |
|---|---|---|
| 4,718,067 A | 1/1988 | Peters |
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |
| 5,715,471 A | 2/1998 | Otsuka |
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,243,795 B1 | 6/2001 | Yang |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,819,367 B1 | 8/2014 | Fallone |
| 8,825,937 B2 | 9/2014 | Atkisson |
| 8,832,688 B2 | 9/2014 | Tang |
| 8,868,825 B1 | 10/2014 | Hayes |
| 8,904,061 B1 | 12/2014 | O'Brien, III |
| 8,949,208 B1 | 2/2015 | Xu |
| 9,015,561 B1 | 4/2015 | Hu |
| 9,031,296 B2 | 5/2015 | Kaempfer |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,213,627 B2 | 12/2015 | Van Acht |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,495,263 B2 | 11/2016 | Pang |
| 9,529,601 B1 | 12/2016 | Dharmadhikari |
| 9,529,670 B2 | 12/2016 | James |
| 9,575,982 B1 | 2/2017 | Sankara Subramanian |
| 9,588,698 B1 | 3/2017 | Karamcheti |
| 9,588,977 B1 | 3/2017 | Wang |
| 9,607,631 B2 | 3/2017 | Rausch |
| 9,671,971 B2 | 6/2017 | Trika |
| 9,747,202 B1 | 8/2017 | Shaharabany |
| 9,852,076 B1 | 12/2017 | Garg |
| 9,875,053 B2 | 1/2018 | Frid |
| 9,912,530 B2 | 3/2018 | Singatwaria |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,268,390 B2 | 4/2019 | Warfield |
| 10,318,467 B2 | 6/2019 | Barzik |
| 10,361,722 B2 | 7/2019 | Lee |
| 10,437,670 B1 | 10/2019 | Koltsidas |
| 10,459,663 B2 | 10/2019 | Agombar |
| 10,642,522 B2 | 5/2020 | Li |
| 10,649,657 B2 | 5/2020 | Zaidman |
| 10,678,432 B1 | 6/2020 | Dreier |
| 10,756,816 B1 | 8/2020 | Dreier |
| 10,928,847 B2 | 2/2021 | Suresh |
| 2001/0032324 A1 | 10/2001 | Slaughter |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1 | 7/2002 | Chandrasekaran |
| 2002/0112085 A1 | 8/2002 | Berg |
| 2002/0161890 A1 | 10/2002 | Chen |
| 2003/0074319 A1 | 4/2003 | Jaquette |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0143718 A1 | 7/2004 | Chen |
| 2004/0255171 A1 | 12/2004 | Zimmer |
| 2004/0267752 A1 | 12/2004 | Wong |
| 2004/0268278 A1 | 12/2004 | Hoberman |
| 2005/0038954 A1 | 2/2005 | Saliba |
| 2005/0097126 A1 | 5/2005 | Cabrera |
| 2005/0138325 A1 | 6/2005 | Hofstee |
| 2005/0144358 A1 | 6/2005 | Conley |
| 2005/0149827 A1 | 7/2005 | Lambert |
| 2005/0174670 A1 | 8/2005 | Dunn |
| 2005/0177672 A1 | 8/2005 | Rao |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0101197 A1 | 5/2006 | Georgis |
| 2006/0156012 A1 | 7/2006 | Beeson |
| 2006/0184813 A1 | 8/2006 | Bui |
| 2007/0033323 A1 | 2/2007 | Gorobets |
| 2007/0061502 A1 | 3/2007 | Lasser |
| 2007/0101096 A1 | 5/2007 | Gorobets |
| 2007/0250756 A1 | 10/2007 | Gower |
| 2007/0266011 A1 | 11/2007 | Rohrs |
| 2007/0283081 A1 | 12/2007 | Lasser |
| 2007/0283104 A1 | 12/2007 | Wellwood |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0163033 A1 | 7/2008 | Yim |
| 2008/0301532 A1 | 12/2008 | Uchikawa |
| 2009/0006667 A1 | 1/2009 | Lin |
| 2009/0089544 A1 | 4/2009 | Liu |
| 2009/0113219 A1 | 4/2009 | Aharonov |
| 2009/0125788 A1 | 5/2009 | Wheeler |
| 2009/0183052 A1 | 7/2009 | Kanno |
| 2009/0254705 A1 | 10/2009 | Abali |
| 2009/0282275 A1 | 11/2009 | Yermalayeu |
| 2009/0287956 A1 | 11/2009 | Flynn |
| 2009/0307249 A1 | 12/2009 | Koifman |
| 2009/0307426 A1 | 12/2009 | Galloway |
| 2009/0310412 A1 | 12/2009 | Jang |
| 2010/0031000 A1 | 2/2010 | Flynn |
| 2010/0169470 A1 | 7/2010 | Takashige |
| 2010/0217952 A1 | 8/2010 | Iyer |
| 2010/0229224 A1 | 9/2010 | Etchegoyen |
| 2010/0241848 A1 | 9/2010 | Smith |
| 2010/0321999 A1 | 12/2010 | Yoo |
| 2010/0325367 A1 | 12/2010 | Kornegay |
| 2010/0332922 A1 | 12/2010 | Chang |
| 2011/0031546 A1 | 2/2011 | Uenaka |

(56) References Cited

U.S. PATENT DOCUMENTS

| | | |
|---|---|---|
| 2011/0055458 A1 | 3/2011 | Kuehne |
| 2011/0055471 A1 | 3/2011 | Thatcher |
| 2011/0060722 A1 | 3/2011 | Li |
| 2011/0072204 A1 | 3/2011 | Chang |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0289263 A1 | 11/2011 | Mcwilliams |
| 2011/0289280 A1 | 11/2011 | Koseki |
| 2011/0292538 A1 | 12/2011 | Haga |
| 2011/0296411 A1 | 12/2011 | Tang |
| 2011/0299317 A1 | 12/2011 | Shaeffer |
| 2011/0302353 A1 | 12/2011 | Confalonieri |
| 2012/0017037 A1 | 1/2012 | Riddle |
| 2012/0039117 A1 | 2/2012 | Webb |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0151253 A1* | 6/2012 | Horn ................. G06F 12/0804 714/6.22 |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0233523 A1 | 9/2012 | Krishnamoorthy |
| 2012/0246392 A1 | 9/2012 | Cheon |
| 2012/0278579 A1 | 11/2012 | Goss |
| 2012/0284587 A1 | 11/2012 | Yu |
| 2012/0324312 A1 | 12/2012 | Moyer |
| 2012/0331207 A1 | 12/2012 | Lassa |
| 2013/0013880 A1 | 1/2013 | Tashiro |
| 2013/0016970 A1 | 1/2013 | Koka |
| 2013/0018852 A1 | 1/2013 | Barton |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0151251 A1 | 6/2013 | Skrenta |
| 2013/0159723 A1 | 6/2013 | Brandt |
| 2013/0166820 A1 | 6/2013 | Batwara |
| 2013/0173845 A1 | 7/2013 | Aslam |
| 2013/0191601 A1 | 7/2013 | Peterson |
| 2013/0205183 A1 | 8/2013 | Fillingim |
| 2013/0219131 A1 | 8/2013 | Alexandron |
| 2013/0227347 A1 | 8/2013 | Cho |
| 2013/0238955 A1 | 9/2013 | Antonio |
| 2013/0254622 A1 | 9/2013 | Kanno |
| 2013/0318283 A1 | 11/2013 | Small |
| 2013/0318395 A1 | 11/2013 | Kalavade |
| 2013/0329492 A1 | 12/2013 | Yang |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0082412 A1 | 3/2014 | Matsumura |
| 2014/0095769 A1 | 4/2014 | Borkenhagen |
| 2014/0095827 A1 | 4/2014 | Wei |
| 2014/0108414 A1 | 4/2014 | Stillerman |
| 2014/0108891 A1 | 4/2014 | Strasser |
| 2014/0164447 A1 | 6/2014 | Tarafdar |
| 2014/0164879 A1 | 6/2014 | Tam |
| 2014/0181532 A1 | 6/2014 | Camp |
| 2014/0195564 A1 | 7/2014 | Talagala |
| 2014/0215129 A1 | 7/2014 | Kuzmin |
| 2014/0223079 A1 | 8/2014 | Zhang |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0143030 A1 | 5/2015 | Gorobets |
| 2015/0199234 A1 | 7/2015 | Choi |
| 2015/0227316 A1 | 8/2015 | Warfield |
| 2015/0234845 A1 | 8/2015 | Moore |
| 2015/0269964 A1 | 9/2015 | Fallone |
| 2015/0277937 A1 | 10/2015 | Swanson |
| 2015/0286477 A1 | 10/2015 | Mathur |
| 2015/0294684 A1 | 10/2015 | Qjang |
| 2015/0301964 A1 | 10/2015 | Brinicombe |
| 2015/0304108 A1 | 10/2015 | Obukhov |
| 2015/0310916 A1 | 10/2015 | Leem |
| 2015/0317095 A1 | 11/2015 | Voigt |
| 2015/0341123 A1 | 11/2015 | Nagarajan |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048327 A1 | 2/2016 | Jayasena |
| 2016/0048341 A1 | 2/2016 | Constantinescu |
| 2016/0054922 A1 | 2/2016 | Awasthi |
| 2016/0062885 A1 | 3/2016 | Ryu |
| 2016/0077749 A1 | 3/2016 | Ravimohan |
| 2016/0077764 A1 | 3/2016 | Ori |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0132237 A1 | 5/2016 | Jeong |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0188223 A1 | 6/2016 | Camp |
| 2016/0188890 A1 | 6/2016 | Naeimi |
| 2016/0203000 A1 | 7/2016 | Parmar |
| 2016/0224267 A1 | 8/2016 | Yang |
| 2016/0232103 A1 | 8/2016 | Schmisseur |
| 2016/0234297 A1 | 8/2016 | Ambach |
| 2016/0239074 A1 | 8/2016 | Lee |
| 2016/0239380 A1 | 8/2016 | Wideman |
| 2016/0274636 A1 | 9/2016 | Kim |
| 2016/0306699 A1 | 10/2016 | Resch |
| 2016/0306853 A1 | 10/2016 | Sabaa |
| 2016/0321002 A1 | 11/2016 | Jung |
| 2016/0335085 A1 | 11/2016 | Scalabrino |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2016/0381442 A1 | 12/2016 | Heanue |
| 2017/0004037 A1 | 1/2017 | Park |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1 | 4/2017 | Chen |
| 2017/0109232 A1 | 4/2017 | Cha |
| 2017/0123655 A1* | 5/2017 | Sinclair ................. G06F 3/0611 |

(56) References Cited

U.S. PATENT DOCUMENTS

| | | |
|---|---|---|
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0185498 A1 | 6/2017 | Gao |
| 2017/0192848 A1 | 7/2017 | Pamies-Juarez |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262176 A1 | 9/2017 | Kanno |
| 2017/0262178 A1 | 9/2017 | Hashimoto |
| 2017/0262217 A1 | 9/2017 | Pradhan |
| 2017/0269998 A1 | 9/2017 | Jung |
| 2017/0279460 A1 | 9/2017 | Camp |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0069658 A1 | 3/2018 | Benisty |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0113631 A1 | 4/2018 | Zhang |
| 2018/0143780 A1 | 5/2018 | Cho |
| 2018/0150640 A1 | 5/2018 | Li |
| 2018/0165038 A1 | 6/2018 | Authement |
| 2018/0165169 A1 | 6/2018 | Camp |
| 2018/0165340 A1 | 6/2018 | Agarwal |
| 2018/0167268 A1 | 6/2018 | Liguori |
| 2018/0173620 A1 | 6/2018 | Cen |
| 2018/0188970 A1 | 7/2018 | Liu |
| 2018/0189175 A1 | 7/2018 | Ji |
| 2018/0189182 A1 | 7/2018 | Wang |
| 2018/0212951 A1 | 7/2018 | Goodrum |
| 2018/0219561 A1 | 8/2018 | Litsyn |
| 2018/0226124 A1 | 8/2018 | Perner |
| 2018/0232151 A1 | 8/2018 | Badam |
| 2018/0260148 A1 | 9/2018 | Klein |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0321864 A1 | 11/2018 | Benisty |
| 2018/0322024 A1 | 11/2018 | Nagao |
| 2018/0329776 A1 | 11/2018 | Lai |
| 2018/0336921 A1 | 11/2018 | Ryun |
| 2018/0349396 A1 | 12/2018 | Blagojevic |
| 2018/0356992 A1 | 12/2018 | Lamberts |
| 2018/0357126 A1 | 12/2018 | Dhuse |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0050327 A1 | 2/2019 | Li |
| 2019/0065085 A1 | 2/2019 | Jean |
| 2019/0073261 A1 | 3/2019 | Halbert |
| 2019/0073262 A1 | 3/2019 | Chen |
| 2019/0087089 A1 | 3/2019 | Yoshida |
| 2019/0087115 A1 | 3/2019 | Li |
| 2019/0087328 A1 | 3/2019 | Kanno |
| 2019/0116127 A1 | 4/2019 | Pismenny |
| 2019/0171532 A1 | 6/2019 | Abadi |
| 2019/0172820 A1 | 6/2019 | Meyers |
| 2019/0196748 A1 | 6/2019 | Badam |
| 2019/0196907 A1 | 6/2019 | Khan |
| 2019/0205206 A1 | 7/2019 | Hornung |
| 2019/0212949 A1 | 7/2019 | Pletka |
| 2019/0220392 A1 | 7/2019 | Lin |
| 2019/0227927 A1 | 7/2019 | Miao |
| 2019/0272242 A1 | 9/2019 | Kachare |
| 2019/0278654 A1 | 9/2019 | Kaynak |
| 2019/0317901 A1 | 10/2019 | Kachare |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0042387 A1 | 2/2020 | Shani |
| 2020/0089430 A1 | 3/2020 | Kanno |
| 2020/0097189 A1 | 3/2020 | Tao |
| 2020/0143885 A1 | 5/2020 | Kim |
| 2020/0159425 A1 | 5/2020 | Flynn |
| 2020/0167091 A1 | 5/2020 | Haridas |
| 2020/0225875 A1 | 7/2020 | Oh |
| 2020/0242021 A1 | 7/2020 | Gholamipour |
| 2020/0250032 A1 | 8/2020 | Goyal |
| 2020/0257598 A1 | 8/2020 | Yazovitsky |
| 2020/0326855 A1 | 10/2020 | Wu |
| 2020/0328192 A1 | 10/2020 | Zaman |
| 2020/0348888 A1 | 11/2020 | Kim |
| 2020/0387327 A1 | 12/2020 | Hsieh |
| 2020/0401334 A1 | 12/2020 | Saxena |
| 2020/0409791 A1 | 12/2020 | Devriendt |
| 2021/0010338 A1 | 1/2021 | Santos |
| 2021/0089392 A1 | 3/2021 | Shirakawa |
| 2021/0103388 A1 | 4/2021 | Choi |

FOREIGN PATENT DOCUMENTS

| | | |
|---|---|---|
| WO | 9418634 | 8/1994 |
| WO | 1994018634 | 8/1994 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India, pp. 1-7, 2017, <10.1145/3124680.3124741 >.

EMC Powerpath Load Balancing and Failover Comparison with native MPIO operating system solutions. Feb. 2011.

Tsuchiya, Yoshihiro et al. "DBLK: Deduplication for Primary Block Storage", MSST 2011, Denver, CO, May 23-27, 2011 pp. 1-5.

Chen Feng, et al. "CAFTL: A Content-Aware Flash Translation Layer Enhancing the Lifespan of Flash Memory based Solid State Devices"< FAST'11, San Jose, CA Feb. 15-17, 2011, pp. 1-14.

Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14https://www.syncids.com/#.

WOW: Wise Ordering for Writes—Combining Spatial and Temporal Locality in Non-Volatile Caches by Gill (Year: 2005).

Helen H. W. Chan et al. "HashKV: Enabling Efficient Updated in KV Storage via Hashing", https://www.usenix.org/conference/atc18/presentation/chan, (Year: 2018).

S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.

Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.

Jimenex, X., Novo, D. and P. Ienne, "Pheonix:Reviving MLC Blocks as SLC to Extend NAND Flash Devices Lifetime,"Design, Automation & Text in Europe Conference & Exhibition (DATE), 2013.

(56) References Cited

OTHER PUBLICATIONS

Yang, T. Wu, H. and W. Sun, "GD-FTL: Improving the Performance and Lifetime of TLC SSC by Downgrading Worn-out Blocks," IEEE 37th International Performance Computing and Communications Conference (IPCCC), 2018.

C. Wu, D. Wu, H. Chou and C. Cheng, "Rethink the Design of Flash Translation Layers in a Component-Based View", in IEEE Acess, vol. 5, p. 12895-12912, 2017.

Po-Liang Wu, Yuan-Hao Chang and T. Kuo, "A file-system-aware FTL design for flash-memory storage systems," 2009, pp. 393-398.

S. Choudhuri and T. Givargis, "Preformance improvement of block based NAND flash translation layer", 2007 5th IEEE/ACM/IFIP International Conference on Hardware/Software Codesign and Systems Synthesis (CODES+ISSS). Saizburg, 2007, pp. 257-262.

A. Zuck, O. Kishon and S. Toledo. "LSDM: Improving the Preformance of Mobile Storage with a Log-Structured Address Remapping Device Driver", 2014 Eighth International Conference on Next Generation Mobile Apps, Services and Technologies, Oxford, 2014, pp. 221-228.

J. Jung and Y. Won, "nvramdisk: A Transactional Block Device Driver for Non-Volatile RAM", in IEEE Transactions on Computers, vol. 65, No. 2, pp. 589-600, Feb. 1, 2016.

Te I et al. (Pensieve: a Machine Assisted SSD Layer for Extending the Lifetime: (Year: 2018).

ARM ("Cortex-R5 and Cortex-R5F", Technical reference Manual, Revision r1p1) (Year:2011).

\* cited by examiner

SYSTEM AND METHOD FOR FLASH STORAGE MANAGEMENT USING MULTIPLE OPEN PAGE STRIPES

BACKGROUND

Field

This disclosure is generally related to the field of data storage. More specifically, this disclosure is related to a system and method for flash ma nagement in, e.g., a solid state drive (SSD), using multiple open page stripes.

Related Art

The proliferation of the Internet and e-commerce continues to create a vast amount of digital content. Various storage systems and servers have been created to access and store such digital content. A storage system or server can include volatile memory (e.g., dynamic random access memory (DRAM) and multiple drives (e.g., a solid state drive (SSD)). A drive can include non-volatile memory for persistent storage (e.g., NAND flash). The memory in a server plays a crucial role in the performance and capacity of a storage system.

For example, in an SSD, flash memory is organized into channels/dies. A channel can include multiple dies; a die can include multiple blocks; and a block can include multiple pages. A host typically writes data to an SSD in units of logical pages (e.g., 4 KB). However, the flash memory itself can only be written in units of physical pages, which are typically greater in size than a logical page (e.g., 16 KB or larger). An SSD controller typically includes a write buffer which holds the data for a host write before the data is flushed (or written) to the flash memory.

Upon receiving a write request, the SSD controller typically stores the data sequentially into "page stripes," which are physical pages across multiple dies. One of the physical pages in a page stripe is typically used to store parity information. A "super page stripe" is a page stripe across all dies on the SSD, i.e., that includes one physical page from each die on the SSD. When the controller has committed the write request to the host, the controller must protect the committed data (stored in the write buffer) from power loss, e.g., by using capacitors. However, because of the power consumption of the flash memory and the limited space on the SSD for power-loss capacitors, the power-loss protected write buffer is typically very small (e.g., several megabytes).

Furthermore, a write request from a host may not fill exact units of physical pages, and typically does not fill an entire super page stripe. These partially filled pages can result in unused space in, e.g., a 16-32 KB physical page. A page stripe which is only partially filled with data (an "open page stripe" or an "incomplete page stripe") is kept in the power-loss protected write buffer. When a page stripe is filled with data (a "closed page stripe" or a "complete page stripe"), the closed page stripe is flushed back to the flash memory. Because the power-loss protected write buffer is small, it can only hold a limited number of open page stripes, e.g., between 1 and 4 super page stripes. Thus, conventional SSDs can typically only support a small number of open page stripes. If the host software attempts to open a greater number of page stripes on the SSD, the system cannot provide a sufficiently large power-loss protected buffer to hold the relevant states. This limitation can reduce the flexibility of host software, and may create a bottleneck in the performance of the server. Furthermore, this limitation can result in inefficiencies in the storage system.

SUMMARY

One embodiment facilitates flash storage management. During operation, the system receives a request to write data to a non-volatile memory. The system writes, in a buffer in association with a controller, the data to a next available portion of a current physical page in a page stripe, wherein the page stripe includes physical pages which each correspond to a sequentially ordered die of the non-volatile memory. The system provides power-loss protection to the current physical page and a second physical page which indicates parity information for the page stripe, thereby allowing the controller to provide power-loss protection to an increased number of partially full page stripes.

In some embodiments, providing the power-loss protection to the current physical page is in response to determining that the current physical page is partially full.

In some embodiments, providing the power-loss protection to the current physical page and the second physical page further comprises, in response to detecting a power loss: marking any unfilled portions of the current physical page and of the second physical page by padding the unfilled portions with dummy data or by including an indicator that the unfilled portions do not contain any relevant data; and flushing the current physical page from the buffer to the non-volatile memory.

In some embodiments, the physical pages included in the page stripe correspond to a plurality or an entirety of sequentially ordered dies of the non-volatile memory.

In some embodiments, writing the data to the next available portion of the current physical page involves writing a logical page of the data.

In some embodiments, flushing the current physical page involves: writing data stored in the current physical page in the write buffer to the non-volatile memory; and marking the flushed current physical page to indicate that the flushed page no longer requires the power-loss protection.

In some embodiments, In response to determining that the current physical page is full, the system: flushes the current physical page from the buffer to the non-volatile memory; and sets as the current physical page a next physical page which corresponds to a next sequentially ordered die in the page stripe.

BRIEF DESCRIPTION OF THE FIGURES

In the figures, like reference numerals refer to the same figure elements.

DETAILED DESCRIPTION

Figure 1:
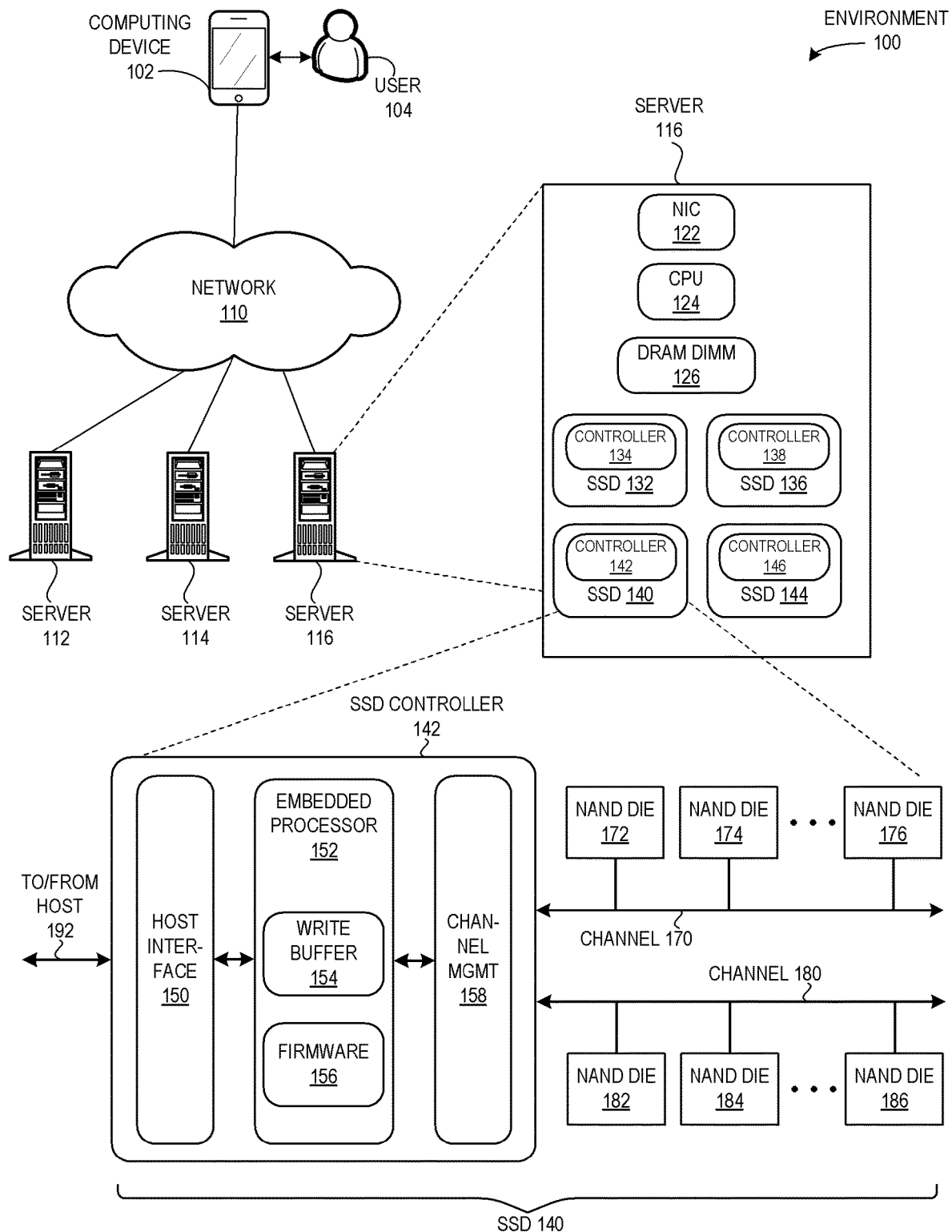
FIG. 1 illustrates an exemplary environment that facilitates flash storage management, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein provide a system which solves the problem of limited data (e.g., a limited number of open page stripes) which can be held in the buffer of a controller and properly protected in the event of a power loss.

In a conventional SSD controller, data can be written to and temporarily held in a write buffer before being flushed or written to the non-volatile memory (e.g., NAND flash). The data is written sequentially into "page stripes," which are physical pages across multiple dies. One of the physical pages in a page stripe is typically used to store parity information. A "super page stripe" is a page stripe across all dies on the SSD, i.e., that includes one physical page from each die on the SSD. The controller must protect the committed data (stored in the write buffer) from power loss, e.g., by using capacitors. However, because of the power consumption of the flash memory and the limited space on the SSD for power-loss capacitors, the power-loss protected write buffer is typically very small (e.g., several megabytes).

Furthermore, a write request from a host may not fill exact units of physical pages, and typically does not fill an entire super page stripe. These partially filled pages can result in unused space in, e.g., a 16-32 KB physical page. A page stripe which is only partially filled with data (an "open page stripe" or an "incomplete page stripe") is kept in the power-loss protected write buffer. When a page stripe is filled with data (a "closed page stripe" or a "complete page stripe"), the closed page stripe is flushed back to the flash memory. Because the power-loss protected write buffer is small, it can only hold a limited number of open page stripes, e.g., between 1 and 4 super page stripes. Thus, conventional SSDs can typically only support a small number of open page stripes. If the host software attempts to open a greater number of page stripes on the SSD, the system cannot provide a sufficiently large power-loss protected buffer to hold the relevant states. This limitation can reduce the flexibility of host software, and may create a bottleneck in the performance of the server. Furthermore, this limitation can result in inefficiencies in the storage system.

The embodiments described herein address these limitations by providing a system which, rather than arranging host write operations in a "horizontal" manner across dies in a page stripe, instead arranges host operations in a "vertical/horizontal hybrid" manner to first fill in each page in the page stripe and then proceed to the next available portion of the next physical page in the next sequentially ordered die in the page stripe.

In the conventional horizontal manner, the system must provide power-loss protection for an entire open page stripe (including all the pages from the dies in the page stripe), as described below in relation to FIGS. 2A and 2B. Consider a typical SSD with 128 NAND dies, and assume that capacitors are designed to protect 256 pages. In this typical SSD, the system can provide power-loss protection to only 2 super page stripes (i.e.: 1 physical page across 128 dies=128 physical pages in one super page stripe which need power-loss protection; and 256 protectable pages/128 physical pages=2 protectable super page stripes).

In contrast, in the "vertical/horizontal hybrid" manner of the embodiments described herein, the system need only provide power-loss protection for two pages in each open page stripe, as described below in relation to FIGS. 3 and 4. The system changes the order in which data is written, by first filling in each page in the page stripe and then proceeding to the next physical page in the next sequentially ordered die in the page stripe. The system also flushes a physical page from the write buffer to the non-volatile memory as soon as the physical page is full. Thus, the system need only provide power-loss protection to two pages in the page stripe: 1) the current physical page (which is either not full or only partially full); and 2) a parity page (which includes parity information for the page stripe). Given the typical SSD from the prior example, the embodiments described herein can provide power-loss protection to 128 open super page stripes (i.e.: 256 protectable pages/2 pages per super page stripe which require protection=128 protectable super page stripes).

Thus, the embodiments described herein provide a system which improves the efficiency and performance of a storage system. The system can significantly reduce the power-loss protection requirement of each open page stripe, which allows the system to provide protection to multiple open page stripes at the same time. The system can also result in an improved efficiency by increasing the flexibility of the host software (to open multiple page stripes at the same time). By implementing the "vertical/horizontal hybrid" manner to write data to non-volatile memory, the system can provide sufficient power-loss protection to a significantly increased number of open page stripes (e.g., multiple open page stripes at the same time).

Exemplary Environment and Network

FIG. 1 illustrates an exemplary environment 100 that facilitates flash storage management, in accordance with an embodiment of the present application. Environment 100 can include a computing device 102 and an associated user 104. Computing device 102 can communicate via a network 110 with storage servers 112, 114, and 116, which can be part of a distributed storage system and accessed via client servers (not shown). A storage server can include multiple storage drives, and each drive can include a controller and multiple physical media for data storage. For example, server 116 can include a network interface card (NIC) 122, a CPU 124, a DRAM DIMM 126, and SSDs 132, 136, 140, and 144 with, respectively, controllers 134, 138, 142, and 146.

A controller can include interfaces to a host and to a non-volatile memory. A controller can also include a write buffer, which is power-loss protected, as well as firmware which includes instructions and/or code to execute the methods described herein. For example, SSD 140 can include SSD controller 142. Controller 142 can include: a host interface 150; an embedded processor 152, which includes a write buffer 154 and a firmware 156; and a channel management 158. SSD controller 142 can communicate with a host (e.g., via host interface 150 and a communication to/from host 192). SSD controller 142 can also communicate with the non-volatile memory (via channel management 158). The non-volatile memory can be accessed via multiple channels. For example, NAND dies 172, 174, and 176 may be accessed via a channel 170, and NAND dies 182, 184, and 186 may be accessed via a channel 180.

During operation, in the embodiments described herein, firmware 156 can include instructions and/or code which allow incoming write data from the host to be written in a "vertical/horizontal hybrid" manner in the physical pages of a page stripe, as described below in relation to FIGS. 3 and 4.

Figure 2A:
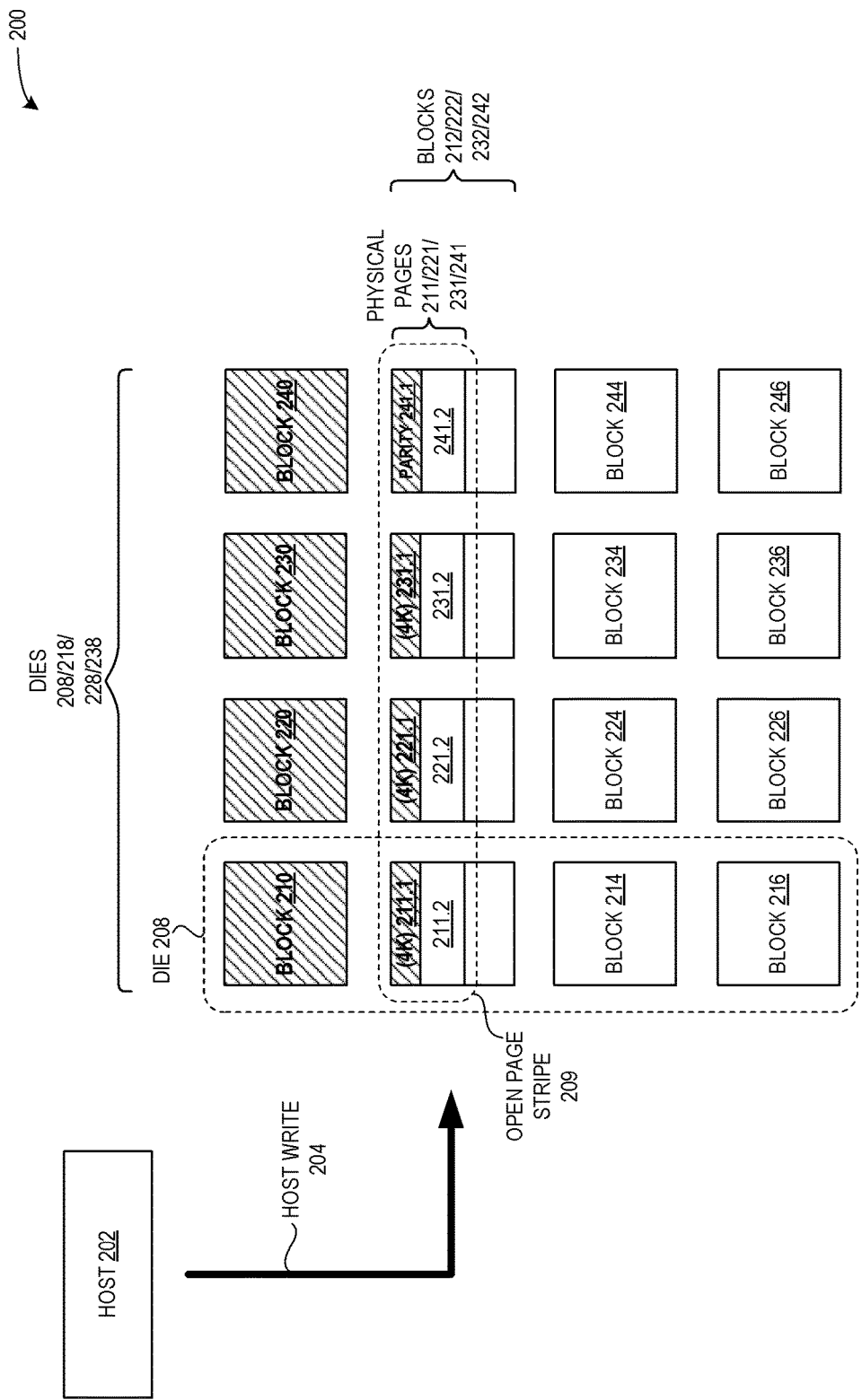
FIG. 2A illustrates an exemplary environment for facilitating flash storage management, in accordance with the prior art.

Exemplary Environment with Entire Power-Loss Protected Open Page Stripe in the Prior Art FIG. 2A illustrates an exemplary environment 200 for facilitating flash storage management, in accordance with the prior art. Environment 200 can include a host 202, which performs a request of a host write 204. Environment 200 includes a non-volatile memory, which can include multiple dies, such as dies 208, 218, 228, and 238. Each die can include multiple blocks, and each block can include multiple pages. For example, die 208 can include blocks 210, 212, 214, and 216, and block 212 can include a physical page 211. Similarly, blocks 222, 232, and 242 can include, respectively, physical pages 221, 231, and 241. In environment 200, a diagonally shaded pattern indicates that (relevant) data has been stored or filled in the respective unit, while a clear pattern (i.e., no pattern) indicates that data has not yet been stored or filled in the respective unit.

Recall that a page stripe can include a physical page across multiple dies. A page stripe which is only partially filled in with data can be referred to as an "open page stripe," and is protected from power loss in the write buffer of the SSD controller. In environment 200, blocks 210, 220, 230, and 240 are completely filled in with data (as indicated with the diagonally shaded pattern). Physical pages 211, 221, 231, and 241 (of, respectively, blocks 212, 222, 232, and 242) are partially filled in (as indicated by the diagonally shaded pattern in 211.1, 221.1, 231.1, and 241.1), and comprise an open page stripe 209.

During operation, in executing host write 204, the system can write data to the pages of open page stripe 209 in a "horizontal" manner. That is, the system writes 4K of data to the next available portion (211.1) of a current physical page (211) of a first sequentially ordered die (208) in the page stripe. Then system then continues to write additional 4K segments to the next available portion (221.1) of the next current physical page (221) of the next sequentially ordered die (218), writes to the next available portion (231.1) of the next current physical page (231), and finally writes the parity information to the next available portion (241.1) of the parity page (e.g., 241).

At this point, the physical pages which comprise open page stripe 209 are partially filled in (as indicated by the mix of the diagonally shaded pattern and no pattern). For example, physical page 211 is partially filled in, as it contains relevant data (4K) 211.1 and also no data in 211.2 (i.e., an unfilled portion). The partially filled physical pages are what define "open" page stripe 209.

If the system suffers a power loss, the SSD controller must provide power-loss protection to the entire open page stripe 209. This can also involve padding the unfilled portions of the physical pages in open page stripe 209 with dummy data. As described above, a conventional SSD controller (given 128 NAND dies and super page stripes) may only be able to provide power-loss protection to two open super page stripes at any given time. This can result in an inefficient storage system.

Figure 2B:
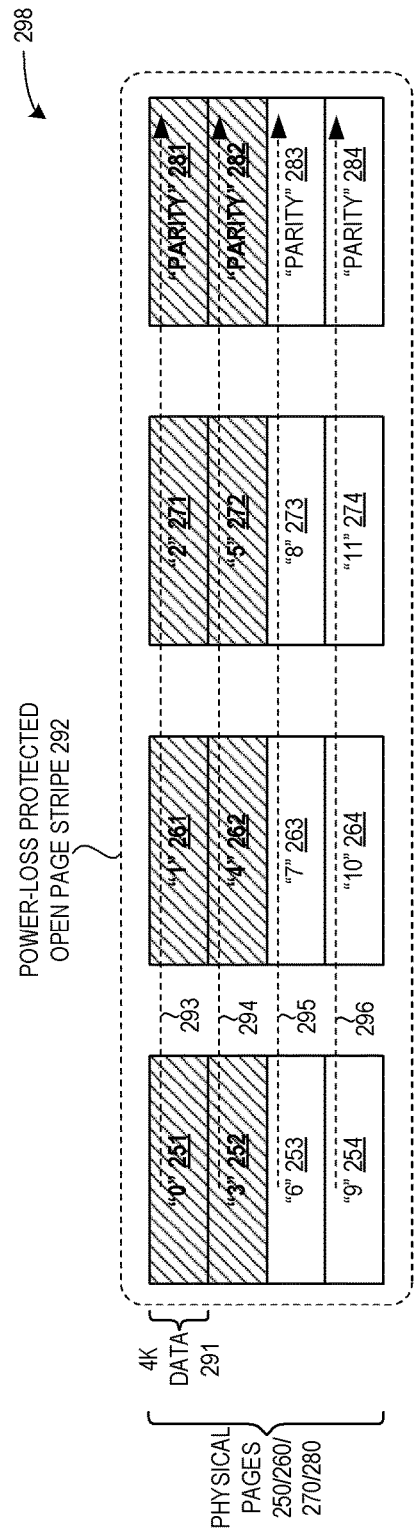
FIG. 2B illustrates an exemplary environment for facilitating flash storage management, including a power-loss protected open page stripe, in accordance with the prior art.

FIG. 2B illustrates an exemplary environment 298 for facilitating flash storage management, including a power-loss protected open page stripe, in accordance with the prior art. Environment 298 can include a power-loss protected open page stripe 292, which includes four physical pages 250, 260, 270, and 280, where each page is associated with or corresponds to a unique die. A super page stripe includes a physical page from the entirety of NAND dies in the non-volatile memory.

In the conventional SSD controller, data is written in a "horizontal" manner. Physical page 250 includes 4 k data segments: data "0" 251, data "3" 252, data "6" 253, and data "9" 254. Similarly: physical page 260 includes data "1" 261, data "4" 262, data "7" 263, and data "10" 264; physical page 270 includes data "3" 271, data "5" 272, data "8" 273, and data "11" 274; and physical page 280 includes parity data 281, parity data 282, parity data 283, and parity data 284. Data is written in a horizontal manner, following the flow depicted by, e.g., communications 293, 294, 295, and 296. That is, data is first written to a beginning portion of a first physical page of a first die, then to a beginning portion of the next physical page on the next die, etc. For example, data is written first to physical page 250 (as block 251), then to physical page 260 (as block 261), then to physical page 270 (as block 271), then to physical page 280 (as parity information 281), as shown via communication 293. Subsequently, data is written starting from the next available portion of the first physical page of the first die, and then across each next available portion of the next sequentially ordered die, e.g.: to physical page 250 (as block 252), then to physical page 260 (as block 262), then to physical page 270 (as block 272), then to physical page 280 (as parity information 282), as shown via communication 294.

Thus, environment 298 depicts an open page stripe 292 which includes partially filled physical pages (e.g., 4K portions 251 and 252 of physical page 250) across multiple dies, where the data has been written in a horizontal manner (e.g., via communications 293 and 294). During a power loss, the SSD controller must provide power-loss protection to the entire open page stripe 292, which can result in an inefficient storage system.

Figure 3:
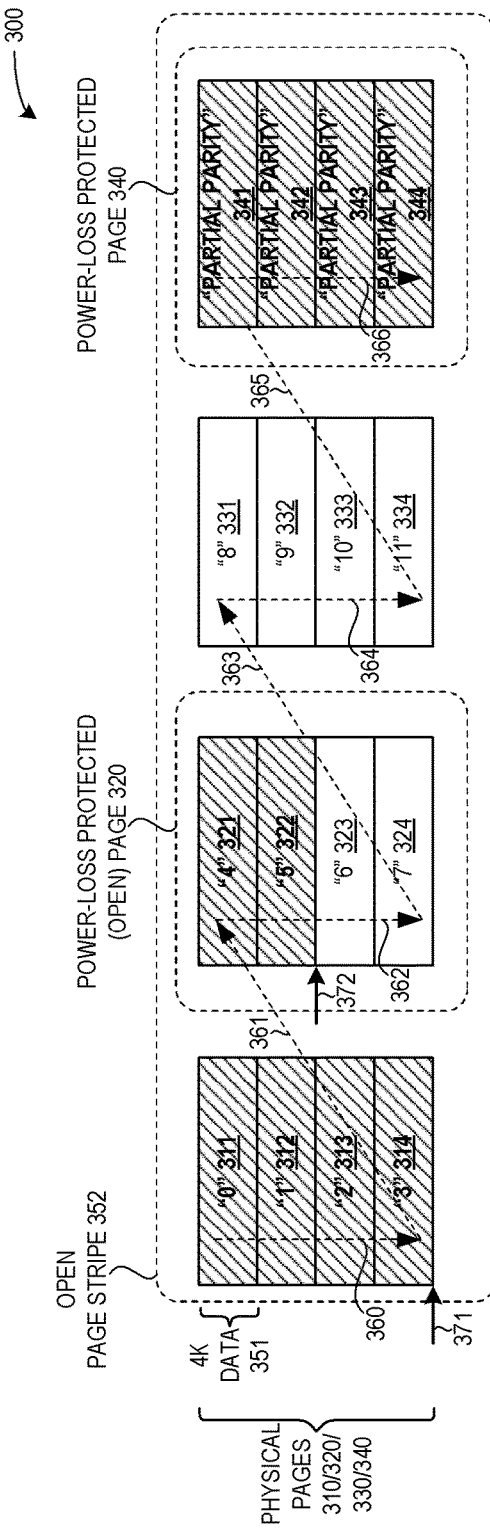
FIG. 3 illustrates an exemplary environment for facilitating flash storage management, including two power-loss protected pages in an open page stripe, in accordance with an embodiment of the present application.

Exemplary Environment for Facilitating Flash Storage Management with Only Two Power-Loss Protected Pages Per Page Stripe FIG. 3 illustrates an exemplary environment 300 for facilitating flash storage management, including two power-loss protected pages in an open page stripe, in accordance with an embodiment of the present application. In contrast to environment 298 of the prior art, environment 300 depicts a "vertical/horizontal hybrid" manner of writing data. Environment 300 can include an open page stripe 352, which includes four physical pages 310, 320, 330, and 340, where each page is associated with, corresponds to, or resides on a unique die.

In the embodiments described herein, data is written in a "vertical/horizontal hybrid" manner. Physical page 310 includes the following 4 k data segments: data "0" 311; data "1" 312; data "2" 313; and data "3" 314. Similarly: physical page 320 includes data "4" 321, data "5" 322, data "6" 323, and data "7" 324; physical page 330 includes data "8" 331, data "9" 332, data "10" 333, and data "11" 334; and physical page 340 includes partial parity data 341, partial parity data 342, partial parity data 343, and partial parity data 344. Data is written in a vertical/horizontal hybrid manner, following the flow depicted by, e.g., communications 360, 361, 362, 363, 364, 365, and 366. That is, data is first written sequentially to a beginning portion of a first physical page of a first die, and then to the next available portion of the same physical page of the first die, until the physical page is full, at which point, the data from that single full physical page is flushed to flash. Subsequently, data is then written beginning from the first available portion of the next physical page of the next sequentially ordered die, and then to the next available portion of that next physical page, until that next physical page is full, at which point, the data from that single full next physical page is flushed to flash.

For example, data is written first to physical page 310 (as block 311), and then is written sequentially within that same physical page 310 (as blocks 312, 313, and 314) until physical page 310 is full (e.g., as shown by communication 360). At that point (indicated by a time 371), the data from the full physical page 310 is flushed to flash. Subsequently, data is written starting from the first available portion of the next physical page of the next sequentially ordered die. That is, data is written to the next physical page 320 (as block 321), and then written sequentially within that same next physical page 320 (as block 322) (e.g., as shown by communication 362). At this point (indicated by a time 372), page 320 is an open page, which has been partially filled with data (e.g., blocks 321 and 322), and must be power-loss protected. Furthermore, page 340 is a page which indicates partial parity information for the partially filled data of page stripe 352, and thus must also be power-loss protected.

Therefore, environment 300 depicts a system in which, by using the vertical/horizontal hybrid manner of placing data and by flushing a full page to flash, the system need only provide power-loss protection for two pages in any open page stripe. That is, during a power loss, the SSD controller does not need to provide power-loss protection to the entire open page stripe (as shown above in environment 298). Instead, the SSD controller only needs to provide power-loss protection to the currently open physical page and the parity page of any given open page stripe, i.e., to two pages per open page stripe. The system can thus provide power-loss protection at a much reduced granularity as compared to conventional systems, i.e., at the page level granularity rather than at a page stripe granularity. This allows the system to provide power-loss protection to a significantly greater number of open page stripes (as compared to the conventional system), and thus improves the efficiency of the storage system.

Method for Facilitating Flash Storage Management

Figure 4:
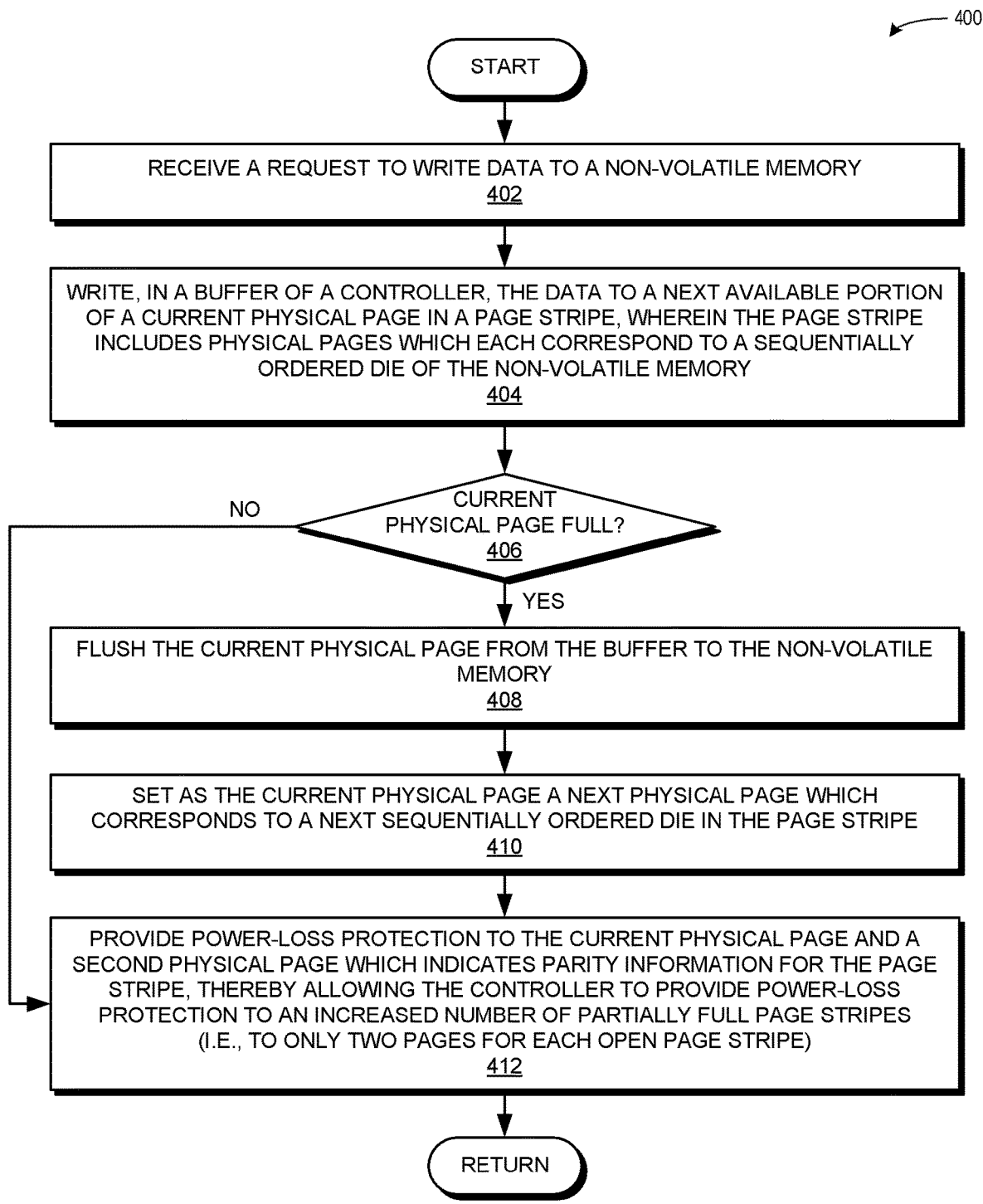
FIG. 4 presents a flowchart illustrating a method for facilitating flash storage management, in accordance with an embodiment of the present application.

FIG. 4 presents a flowchart 400 illustrating a method for facilitating flash storage management, in accordance with an embodiment of the present invention. During operation, the system receives a request to write data to a non-volatile memory (operation 402). The system writes, in a buffer of a controller, the data to a next available portion of a current physical page in a page stripe, wherein the page stripe includes physical pages which each correspond to a sequentially ordered die of the non-volatile memory (operation 404). If the current physical page is not full, the operation continues as described below at operation 412.

If the current physical page is full (decision 406), the system flushes (the data in) the current physical page from the buffer to the non-volatile memory (operation 408). The system sets as the current physical page a next physical page which corresponds to a next sequentially ordered die in the page stripe (operation 410). The system provides power-loss protection to the current physical page and a second physical page which indicates parity information for the page stripe, thereby allowing the controller to provide power-loss protection to an increased number of partially full page stripes (i.e., to only two pages for each open page stripe) (operation 412).

Limitations Associated with Alternative Solutions

In one alternative solution, an SSD may include a multi-stream feature which supports multiple write streams from the host. For example, Kang et al., "The Multi-streamed Solid-State Drive," available at "http://csl.skku.edu/uploads/ICE3028S17/multi-stream.pdf" (hereinafter "Kang"), describes how, in a multi-stream SSD, a host system can explicitly open streams in the SSD and send write requests to different streams based on their expected lifetime. However, a multi-stream SSD requires the host to attach additional information (e.g., stream ID) to its write requests, which transforms the command interface between the host and the SSD to a non-standard interface. In contrast, the embodiments described herein are transparent to the host, and require no modification to the host/device interface.

Furthermore, a multi-stream SSD maps host write streams to blocks, where data from a given stream is written sequentially in a block. This design does not take into account the need for parity or parity groups, which are crucial for SSDs operating in data centers. Without this crucial parity information, a multi-stream SSD can be vulnerable to die failure, which can result in data loss. In contrast, the embodiments described herein specifically provide power-loss protection to two pages per open stripe, one page of which contains parity information.

Yet another limitation of a multi-stream SSD is that all of the data of a stream is in the same block, which prevents the multi-stream SSD from leveraging the internal parallelism from multiple dies. In contrast, the embodiments described herein can leverage the internal parallelism of multiple dies, which can result in much better read performance than the multi-stream SSD.

Another alternative solution is to sub-divide or split a super page stripe into multiple smaller sections (i.e., smaller page stripes). For example, if a super page stripe covers 128 dies, in this alternative solution, a system can split the super page stripe into four sub-groups, where each sub-group covers 32 dies. By decreasing the size of the page stripe, such a solution can increase the number of open page stripes that can be power-loss protected. However, this solution is still limited by the following factors: 1) The system cannot divide the page stripes infinitely, i.e., the page stripes are limited on a minimum size, or how few dies a page stripe can cover; 2) A shorter page stripe can result in a reduced bandwidth; and 3) Accounting for the necessary parity in the increased number of smaller page stripes can increase the overhead (e.g., a super page stripe only requires one parity page for 127 dies, whereas, given the example above, a smaller page stripe requires one parity page for 31 dies).

In contrast, the embodiments described herein are independent of the width of the page stripe. Furthermore, the embodiments described herein require only a firmware update to the SSD controller, include the necessary parity information to support reliability and performance in a data center, leverage the internal parallelism from multiple dies, and do not require any interface changes.

Exemplary Computer System and Apparatus

Figure 5:
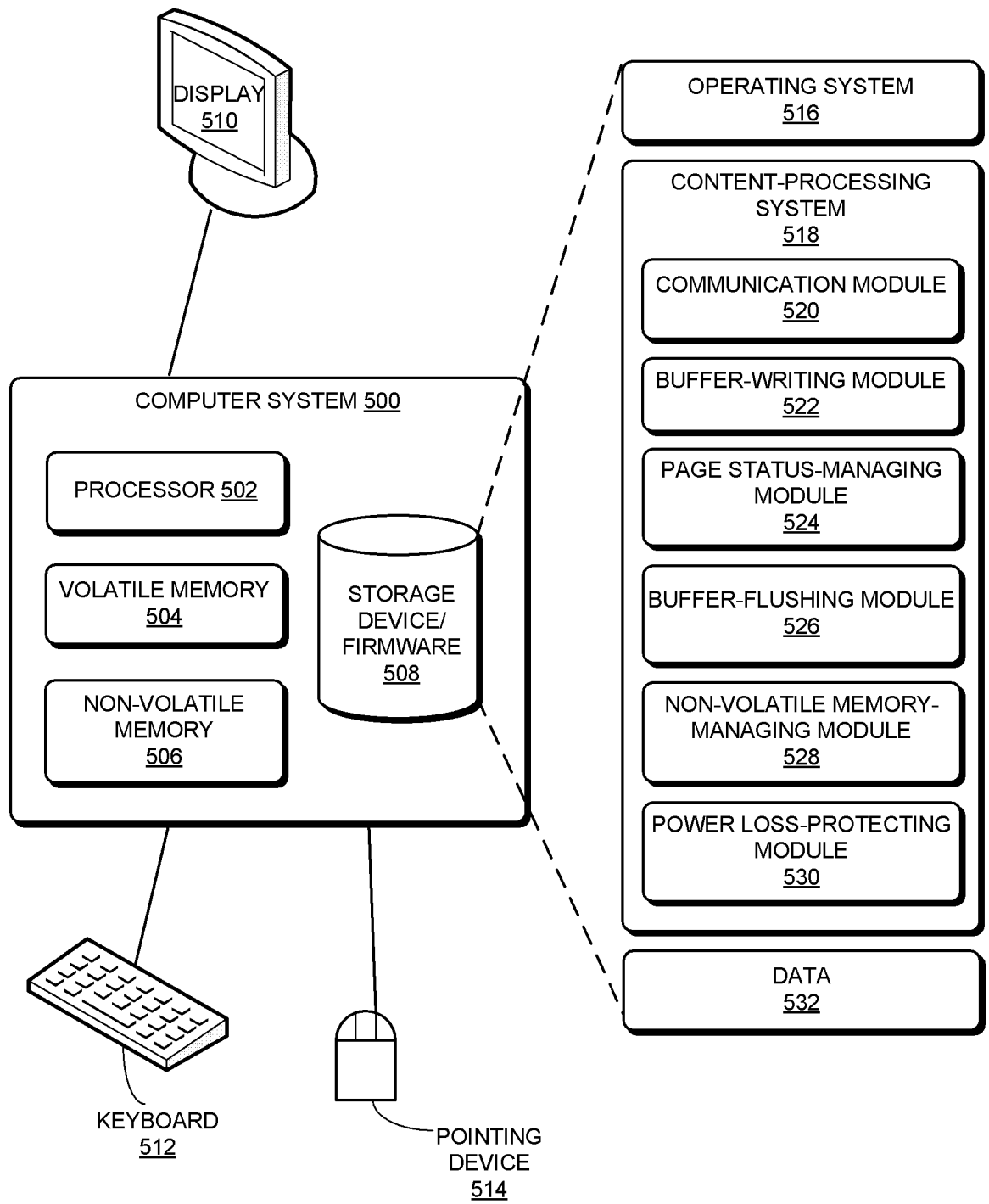
FIG. 5 illustrates an exemplary computer system that facilitates flash storage management, in accordance with an embodiment of the present application.

FIG. 5 illustrates an exemplary computer system 500 that facilitates flash storage management, in accordance with an embodiment of the present application. Computer system 500 includes a processor 502, a memory 504, and a storage device/firmware 508. Computer system 500 may be a computing device or a storage device. Volatile memory 504 can include memory (e.g., RAM) that serves as a managed memory, and can be used to store one or more memory pools. Non-volatile memory 506 can include memory (e.g., NAND flash) which is used for persistent storage. Furthermore, computer system 500 can be coupled to a display device 510, a keyboard 512, and a pointing device 514. Storage device/firmware 508 can store an operating system 516, a content-processing system 518, and data 532. Note that firmware 508 may alternatively be located in or included in other components of computer system 500.

Content-processing system 518 can include instructions, which when executed by computer system 500, can cause computer system 500 to perform methods and/or processes described in this disclosure. For example, content-processing system 518 can include instructions for receiving and transmitting data packets, including a request to write or read data, data to be encoded and stored, or a block or a page of data.

Content-processing system 518 can further include instructions for receiving a request to write data to a non-volatile memory (communication module 520). Content-processing system 518 can include instructions for writing, in a buffer of a controller, the data to a next available portion of a current physical page in a page stripe (buffer-writing module 522). Content-processing system 518 can include instructions for, in response to determining that the current physical page is full (page status-managing module 524): flushing the current physical page from the buffer to the non-volatile memory (buffer-flushing module 526 and non-volatile memory-managing module 528); and setting as the current physical page a next physical page which corresponds to a next sequentially ordered die in the page stripe (page status-managing module 524). Content-processing system 518 can include instructions for providing power-loss protection to the current physical page and a second physical page which indicates parity information for the page stripe (power loss-protecting module 530).

Content-processing system 518 can also include instructions for, in response to detecting a power loss (power loss-protecting module 530): marking any unfilled portions of the current physical page and of the second physical page by padding the unfilled portions with dummy data or by including an indicator that the unfilled portions do not contain any relevant data (page status-managing module 524); and flushing the current physical page from the buffer to the non-volatile memory (buffer-flushing module 526 and non-volatile memory-managing module 528).

Data 532 can include any data that is required as input or that is generated as output by the methods and/or processes described in this disclosure. Specifically, data 532 can store at least: data to be stored, written, loaded, moved, retrieved, deleted, or copied; a logical unit of data; a physical unit of data; a physical page of data; a block of data; a page stripe; an open page stripe; a closed page stripe; a super page stripe; a request; a request which indicates data to be read or written; dummy data; an indicator that a portion of a page does not contain any relevant data; a logical block address (LBA); a physical block address (PBA); an indicator of a status of a page; an indicator of a next available portion of a page; a sequential order; a sequential order for a plurality or an entirety of dies of a non-volatile memory; a write buffer; instructions to flush data from the write buffer to the non-volatile memory; and an indicator of whether a page or a page stripe is open or partially full.

Figure 6:
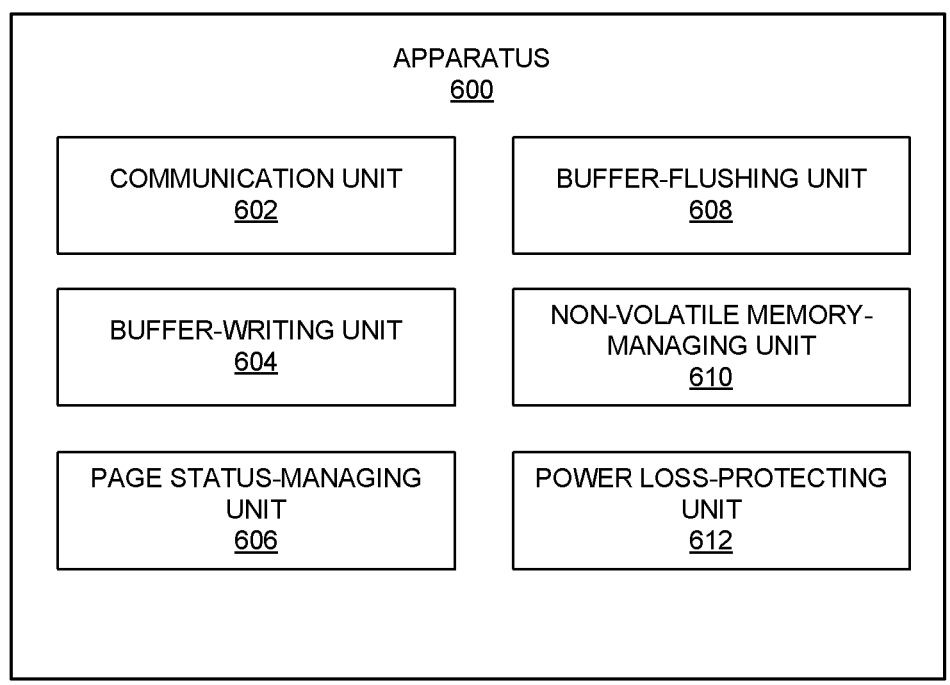
FIG. 6 illustrates an exemplary apparatus that facilitates flash storage management, in accordance with an embodiment of the present application.

FIG. 6 illustrates an exemplary apparatus 600 that facilitates flash storage management, in accordance with an embodiment of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device which is capable of communicating with other computer systems and/or devices. Specifically, apparatus 600 can comprise units 602-612 which perform functions or operations similar to modules 520-530 of computer system 500 of FIG. 5, including: a communication unit 602; a buffer-writing unit 604; a page status-managing unit 606; a buffer-flushing unit 608; a non-volatile memory-managing unit 610; and a power loss-protecting unit 612.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating flash storage management, the method comprising:
 receiving a request to write data to a non-volatile memory;
 writing, in a buffer in association with a controller, a first part of the data to fill next available portions of a current physical page in a page stripe until the current physical page is full, wherein the page stripe includes physical pages which each correspond to a sequentially ordered die of the non-volatile memory;
 flushing the current physical page from the buffer to the non-volatile memory;

writing a remainder of the data to available portions of a next physical page in the page stripe to obtain a partially filled physical page, wherein a second physical page of the page stripe comprises parity information for the first part of the data and the remainder of the data in the partially filled physical page; and providing power-loss protection only to the partially filled physical page and the second physical page which indicates parity information for partially filled data of the page stripe without providing power-loss protection to the flushed current physical page and any unfilled physical pages in the page stripe.

2. The method of claim 1, further comprising:
providing power-loss protection to the current physical page in response to determining that the current physical page is partially full.

3. The method of claim 1, wherein providing the power-loss protection to the partially filled physical page and the second physical page further comprises:
in response to detecting a power loss:
marking any unfilled portions of the partially filled physical page and of the second physical page by padding the unfilled portions with dummy data or by including an indicator that the unfilled portions do not contain any relevant data to obtain a first page and a second page; and
flushing the first page and the second page from the buffer to the non-volatile memory.

4. The method of claim 1, wherein the physical pages included in the page stripe correspond to a plurality or an entirety of sequentially ordered dies of the non-volatile memory.

5. The method of claim 1, wherein writing the first part of the data to fill the next available portions of the current physical page involves writing a logical page of the data.

6. The method of claim 1, wherein flushing the current physical page involves:
writing data stored in the current physical page in the write buffer to the non-volatile memory; and
marking the flushed current physical page to indicate that the flushed page no longer requires the power-loss protection.

7. The method of claim 1, further comprising:
in response to determining that the current physical page is full:
flushing the current physical page from the buffer to the non-volatile memory; and
setting as the current physical page a next physical page which corresponds to a next sequentially ordered die in the page stripe.

8. A computer system for facilitating flash storage management, the system comprising:
a processor; and
a memory coupled to the processor and storing instructions, which when executed by the processor cause the processor to perform a method, the method comprising:
receiving a request to write data to a non-volatile memory;
writing, in a buffer in association with a controller, a first part of the data to fill next available portions of a current physical page in a page stripe until the current physical page is full, wherein the page stripe includes physical pages which each correspond to a sequentially ordered die of the non-volatile memory;
flushing the current physical page from the buffer to the non-volatile memory;

writing a remainder of the data to available portions of a next physical page in the page stripe to obtain a partially filled physical page, wherein a second physical page of the page stripe comprises parity information for the first part of the data and the remainder of the data in the partially filled physical page; and providing power-loss protection only to the partially filled physical page and the second physical page which indicates parity information for partially filled data of the page stripe without providing power-loss protection to the flushed current physical page and any unfilled physical pages in the page stripe.

9. The computer system of claim 8, wherein the method further comprises:
providing power-loss protection to the current physical page in response to determining that the current physical page is partially full.

10. The computer system of claim 8, wherein providing the power-loss protection to the partially filled physical page and the second physical page further comprises:
in response to detecting a power loss:
marking any unfilled portions of the partially filled physical page and of the second physical page by padding the unfilled portions with dummy data or by including an indicator that the unfilled portions do not contain any relevant data to obtain a first page and a second page; and
flushing the first page and the second page from the buffer to the non-volatile memory.

11. The computer system of claim 8, wherein the physical pages included in the page stripe correspond to a plurality or an entirety of sequentially ordered dies of the non-volatile memory.

12. The computer system of claim 8, wherein writing the first part of the data to fill the next available portions of the current physical page involves writing a logical page of the data.

13. The computer system of claim 8, wherein flushing the current physical page involves:
writing data stored in the current physical page in the write buffer to the non-volatile memory; and
marking the flushed current physical page to indicate that the flushed page no longer requires the power-loss protection.

14. The computer system of claim 8, wherein the method further comprises:
in response to determining that the current physical page is full:
flushing the current physical page from the buffer to the non-volatile memory; and
setting as the current physical page a next physical page which corresponds to a next sequentially ordered die in the page stripe.

15. An apparatus for facilitating flash storage management, the device comprising:
a communication unit configured to receive a request to write data to a non-volatile memory;
a buffer-writing unit configured to write, in a buffer in association with a controller, a first part of the data to fill next available portions of a current physical page in a page stripe until the current physical page is full, wherein the page stripe includes physical pages which each correspond to a sequentially ordered die of the non-volatile memory;

a buffer-flushing unit configured to flush the current physical page from the buffer to the non-volatile memory;

wherein the buffer-writing unit is further configured to write a remainder of the data to available portions of a next physical page in the page stripe to obtain a partially filled physical page, wherein a second physical page of the page stripe comprises parity information for the first part of the data and the remainder of the data in the partially filled physical page; and a power loss-protecting unit configured to provide power-loss protection only to the partially filled physical page and the second physical page which indicates parity information for the page stripe without providing power-loss protection to the flushed current physical page and any unfilled physical pages in the page stripe.

16. The apparatus of claim 15, wherein the power loss-protecting unit is further configured to provide power-loss protection to the current physical page in response to determining that the current physical page is partially full.

17. The apparatus of claim 15, wherein the power loss-protecting unit providing the power-loss protection to the partially filled physical page and the second physical page is further configured to, in response to detecting a power loss:

communicate with the page status-managing unit which is further configured to mark any unfilled portions of the partially filled physical page and of the second physical page by padding the unfilled portions with dummy data or by including an indicator that the unfilled portions do not contain any relevant data to obtain a first page and a second page; and communicate with the buffer-flushing unit configured to flush the first page and the second page from the buffer to the non-volatile memory.

18. The apparatus of claim 15, wherein the physical pages included in the page stripe correspond to a plurality or an entirety of sequentially ordered dies of the non-volatile memory.

19. The apparatus of claim 15, wherein the buffer-writing unit writing the first part of the data to fill the next available portions of the current physical page involves writing a logical page of the data.

20. The apparatus of claim 15, wherein the buffer-flushing unit flushing the current physical page involves:

writing data stored in the current physical page in the write buffer to the non-volatile memory; and marking the flushed current physical page to indicate that the flushed page no longer requires the power-loss protection.

* * * * *